(12) United States Patent
Neumayer

(10) Patent No.: US 9,684,063 B1
(45) Date of Patent: Jun. 20, 2017

(54) RADAR SIGNAL DATA PROCESSOR

(71) Applicant: Raytheon Canada Limited, Ottawa (CA)

(72) Inventor: Anton Neumayer, Ayr (CA)

(73) Assignee: RAYTHEON CANADA LIMITED, Ottawa (CA)

( * ) Notice: Subject to any disclaimer, the term of this patent is extended or adjusted under 35 U.S.C. 154(b) by 507 days.

(21) Appl. No.: 14/456,355

(22) Filed: Aug. 11, 2014

(51) Int. Cl.
*G01S 13/28* (2006.01)
*G01S 7/292* (2006.01)
*G01S 13/66* (2006.01)
*G01S 13/02* (2006.01)

(52) U.S. Cl.
CPC ............ *G01S 7/2923* (2013.01); *G01S 13/28* (2013.01); *G01S 13/66* (2013.01); *G01S 2013/0245* (2013.01)

(58) Field of Classification Search
CPC ........ G01S 7/2923; G01S 13/28; G01S 13/66; G01S 2013/0245
USPC ............................... 342/195, 93, 95–97, 159
See application file for complete search history.

(56) References Cited

U.S. PATENT DOCUMENTS

| | | | | |
|---|---|---|---|---|
| 5,414,643 A * | 5/1995 | Blackman | ............ | G01S 13/726 342/95 |
| 5,537,118 A * | 7/1996 | Appriou | .................. | G01S 13/86 342/95 |
| 7,536,388 B2 * | 5/2009 | Jung | ...................... | G01D 9/005 |
| 7,840,031 B2 * | 11/2010 | Albertson | .......... | A63B 24/0003 382/103 |
| 9,261,383 B2 * | 2/2016 | Jung | ...................... | G01D 9/005 |
| 2004/0137915 A1 * | 7/2004 | Diener | ................ | H04L 41/0896 455/456.1 |
| 2008/0169968 A1 * | 7/2008 | Easthope | .............. | G01S 13/726 342/95 |
| 2009/0254572 A1 * | 10/2009 | Redlich | .................. | G06Q 10/06 |
| 2015/0241558 A1 * | 8/2015 | Garrett | .................. | G01S 13/726 342/146 |

OTHER PUBLICATIONS

H. Godrich, A. Tajer and H. V. Poor, "Distributed target tracking in multiple widely separated radar architectures," 2012 IEEE 7th Sensor Array and Multichannel Signal Processing Workshop (SAM), Hoboken, NJ, 2012, pp. 153-156.*
Pankratius, et al., "Software Engineering for Multicore Systems—An Experience Report". Technical Report, Institute for Program Structure and Data Organization (IPD); University of Karlsruhe, Germany, Dec. 2007; 10 pages.
Texas Instruments "Multicore Programming Guide: Multicore Programming and Applications/DSP Systems", Aug. 2012.

(Continued)

*Primary Examiner* — John B Sotomayor
(74) *Attorney, Agent, or Firm* — Daly, Crowley, Mofford & Durkee, LLP

(57) ABSTRACT

A system provides high-throughput radar signal processing without resorting to costly parallel processing tool kits. The system breaks the signal processing chain into a series of independent data processing units (DPUs) that execute independently and in parallel. Queuing theory is used to efficiently distribute processing across multiple processor cores and/or computers. The system scales to an arbitrary number of cores/computers. The independent nature of the DPUs readily allows addition/replacement of new filters into the system.

20 Claims, 4 Drawing Sheets

(56) References Cited

OTHER PUBLICATIONS

Bhal, et al., "Overcoming the challenges of Multicore software development" (Website) http://www.embedded.com/design/multicore-collection/4214354/1/Overcoming-the-challenges-of-multicore-software-development-; 4 pages (printed).

\* cited by examiner

RADAR SIGNAL DATA PROCESSOR

BACKGROUND

As is known in the art, phased array radar systems require extensive and costly signal processing hardware and software in order to meet real-time requirements. Existing radar signal processors rely on custom built and/or specialized high-end, limited volume equipment, resulting in high capital outlay, integration and validation costs. To process large amounts of data on such systems, programmers must write code that distributes the elements of a function to multiple processors. This is an expensive process that requires specialized processing tool kits and expertise.

SUMMARY

It is appreciated herein that it would be desirable to provide a system for processing radar signal data having a scalable architecture based upon commercial off-the-shelf (COTS) hardware and/or software.

Accordingly, a system for processing radar data comprises a plurality of detector signal data processors (SDPs) coupled to receive radar data and to generate detection data, each of the detector SDPs comprising at least one processor and a plurality of data processing units (DPUs) executing on the processor, each of the DPUs comprising an input port, a queue, a filter, and an output port, each of the DPUs to receive data into the queue via the input port, to determine data is available in the queue, to remove the available data from the queue, to process the available data using the filter, and to output the processed data at the output port. The system may further comprise an aggregator SDP coupled to receive detection data from two or more of the plurality of detector SDPs and, in response thereto, to generate a stream of plot information based upon the received detection data. In embodiments, the system also comprises a radar tracker or other external system coupled to receive the stream of plot information from the data aggregation processor.

It will be appreciated that the system provides high-throughput radar signal processing without resorting to relatively expensive parallel processing tool kits. The system breaks the signal processing chain into a series of independent data processing units (DPUs) that can execute independently and in parallel. Queuing theory is used to efficiently distribute processing across multiple processor cores and/or computers. The system scales to an arbitrary number of cores/computers. The independent nature of the DPUs readily allows addition/replacement of new filters into the system.

In some embodiments, the system further comprises a multiplexer coupled to receive the radar data and to select one of the plurality of detector SDPs to process the received radar data. In certain embodiments, the aggregator SDP comprises a demultiplexer to correlate and aggregate the received detection data. In some embodiments, at least one of the plurality of detector SDPs comprises a plurality of DPUs arranged in series. In embodiments, at least one of the plurality of detector SDPs comprises a DPU having an impulsive interference filter (IIF), a DPU having a Doppler filter, a DPU having a clutter filter, and a DPU having a constant false alarm rate (CFAR). In certain embodiments, the aggregator SDP further comprises a plot extractor. In some embodiments, the aggregator SDP comprises a data formatter to generate the stream of plot information according to the Structured Eurocontrol Surveillance Information Exchange (ASTERIX) standard.

The plurality of detector SDPs and the aggregator SDP may be coupled via a packet-switched network and the aggregator SDP may be coupled to the radar tracker via a radar data network. In some embodiments, at least one of the detector SDPs further comprises an ingest module to receive the radar data via the packet-switched network and to copy the received radar data to the queue of at least one of the respective DPUs.

In particular embodiments, a radar comprises a phased array antenna, wherein the radar data comprises blocks of data having associated elevation angles, wherein the multiplexer selects one of the plurality of detector SDPs based upon an elevation angle associated with the received radar data.

In embodiments, at least one of the detector SDPs comprises two or more DPUs configured to execute on separate threads and/or as separate processes. The DPUs may use a semaphore to determine data is available in a queue.

According to another aspect, a method for processing radar data comprises receiving radar data, moving the radar data to a first queue, determining the radar data is available in the first queue, removing the radar data from the first queue, processing the radar data using a first filter to generate first processed data, moving the first processed data to a second queue, determining the first processed data is available in the second queue, removing the first processed data from the second queue, processing the first processed data using a second filter to generate second processed data, performing plot detection on the second processed data to generate detection data, aggregating the detection data with other detection data to generate aggregate detection data, and performing plot extraction on the aggregate detection data to generate a stream of plot information. In some embodiments, the method further comprises providing the stream of plot information to a radar tracker.

The method may employ various filters, such as an IIF, a Doppler filter, a clutter filter, a CFAR, a cell-averaging CFAR, an ordered statistic CFAR, a binary integrator, a beamformer, or an external interference cancellation filter.

In embodiments, at least two different steps of the method are executed on separate threads. For example, moving radar data to a first queue may be executed on a first thread, whereas processing the radar data using a first filter to generate first processed data may be executed on a second thread. In some embodiments, determining the radar data is available in the first queue comprises reading the value of a semaphore.

In some embodiments, the system and/or method may be used to process radar data comprising blocks of digital pulse compressed data.

BRIEF DESCRIPTION OF THE DRAWINGS

The concepts, structures, and techniques sought to be protected herein may be more fully understood from the following detailed description of the drawings, in which:

FIG. 1A is a block diagram of an illustrative arrangement of DPUs;

DETAILED DESCRIPTION

Figure 1:
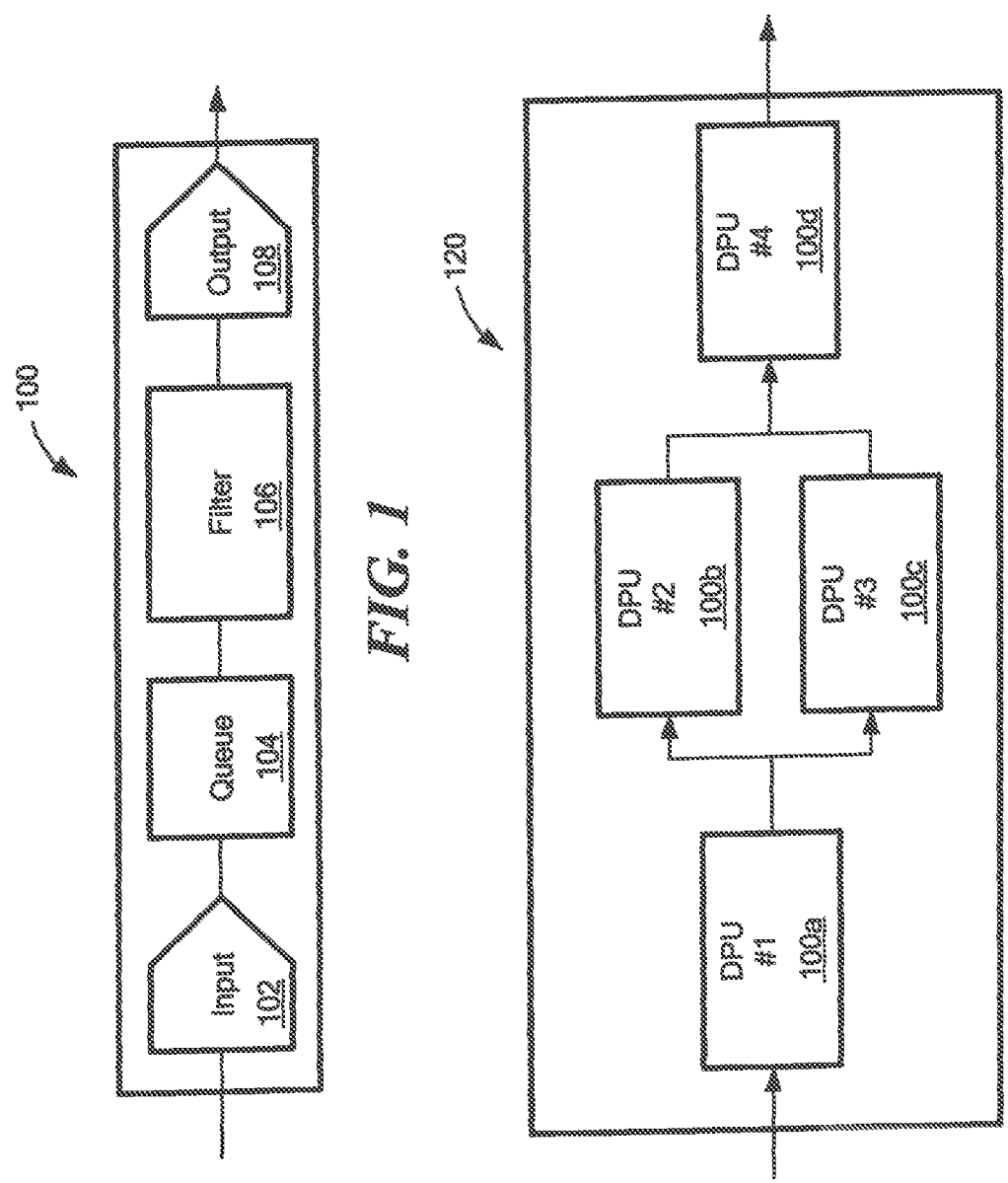
FIG. 1 is a block diagram of an illustrative data processing unit (DPU)

Referring to FIG. 1, a data processing unit (DPU) 100 provides an independently and loosely coupled processing function within a signal data processing system. The illustrative DPU 100 includes an input port 102, a queue 104, a filter 106, and an output port 108. The queue 104 may use a first-in first-out (FIFO) policy, a priority-based policy, or any other suitable queuing policy known in the art.

The filter 106 may be provided from any suitable combination of hardware and/or software to provide a DPU 100 having a desired signal data processing function. In some embodiments, the filter 106 comprises an impulsive interference filter (IIF), a Doppler filter (e.g., a 5-bin or 256-bin Doppler filter), a clutter filter, a constant false alarm rate (CFAR), a cell-averaging CFAR (e.g., operating on 5-bin or 256-bin Doppler filtered data), an ordered statistic CFAR (e.g., operating on 256-bin Doppler filtered data), a binary integrator, a plot extractor, a beamformer (e.g., deriving 64, or 128 azimuth beams), and/or an external interference cancellation.

The input port 102 and output port 108 may represent any suitable data transfer mechanisms. For example, if the DPU 100 is provided as an object (in the object-oriented programming sense), the input port 102 may correspond to a message receiver and the output port 108 may correspond to a message sender. If the DPU 100 is provided as an application program (or "software application") configured to execute upon a general-purpose computer (e.g., an x86-based computer), the ports 102, 108 may correspond to inter-process communication (IPC) mechanisms available on the computer's operating system (OS), such as UNIX pipe, shared memory, or a file. If the DPU 100 is provided as a network service, the ports 102, 108 may correspond to network endpoints.

In general operation, the DPU 100 receives data into the queue 104 via the input port 102. In some embodiments, the received data comprises one or more blocks of data. In certain embodiments, blocks of received data generally have the same fixed size. In some embodiments, the received data comprises one or more blocks of digital pulse compressed data generated by a radar. The radar may generate a stream of such blocks representative of pulse information transmitted and received by the radar. The received data is added (e.g., copied) to the queue 104. In some embodiments, two or more threads can access the queue 104 concurrently and, therefore, a mutual exclusion object ("mutex"), semaphore, or other suitable thread safety mechanism may be employed before the received data is added to the queue.

Those skilled in the art will understand that a mutex is a mechanism by which multiple threads within a program can share a resource while preventing that multiple threads do not access the resource simultaneously. Non-limiting examples of shared resources include files and memory. A mutex may be initialized when a program starts up and before threads are initialized. During initialization, a mutex is typically assigned a name that is unique within the program. Subsequently, any thread that needs to access the shared resource must obtain a "lock" on mutex; when one thread has a lock on a mutex, other threads are prevented from accessing the resource. Accordingly, a thread should "unlock" the mutex (i.e., release its lock on the mutex) when it has completed accessing the shared resource.

The queue maintains data which has not yet been processed by the DPU 100 (referred to herein as "available data"). In an asynchronous manner, the DPU 100 determines that data is available in the queue 104, removes the available data from the queue, and processes the available data using the filter 106. In some embodiments, a semaphore is used to notify the DPU of available data, as described further in conjunction with FIG. 1A. Similar to adding data to the queue, a mutex or other thread safety mechanism may be employed before data can be safely removed from the queue. Once processing is complete, the processed data is provided via the output port 108.

Those skilled in the art will understand that the act of attempting to read the semaphore causes a reading thread to block until the semaphore is signaled by another thread (e.g., via the act of moving data into the queue). Advantageously, such blocking action causes the OS to schedule execution of another thread that is not blocked, thereby making more efficient use of available resources. In other words, execution of a given thread is inhibited until such time as data is available, giving priority to threads (and thus DPUs) having data available.

Referring to FIG. 1A, an illustrative arrangement of DPUs includes a first DPU 100a operatively coupled to receive data (e.g., radar signal data) from an external data source (not shown); second and third DPUs 100b, 100c operatively coupled to receive data from the first DPU 100a; and a fourth DPU 100d operatively coupled to receive data from the second and third DPUs and operatively coupled to provide data to an external data sink (not shown). Any of the DPUs 100a-100d may be the same as or similar to DPU 100 of FIG. 1. In general, a DPU can receive input from one or more other DPUs (or external data sources) and can provide output to one or more other DPUs (or external data sinks). Thus, DPUs can be arranged in parallel, in series (e.g., to form a pipeline), or in any combination thereof. The DPUs 100a-100d may be connected using hardware-based connections, software-based connections, or a combination of both hardware and software. Although FIG. 1A shows a particular arrangement of four DPUs, it should be understood that the concepts and techniques sought to be protected herein can be applied to any number of DPUs arranged in any desired configuration.

Each of the DPUs 100a-100d is generally self-contained, meaning that processing performed by one DPU does not depend upon processing performed by other DPUs. Any dependency between DPUs is managed at the system topology level via input and output port coupling. In addition, because the DPUs employ input queues, there are no timing dependencies between DPUs or other synchronization concerns.

In particular embodiments, two or more of the DPUs 100a-100d are provided within a common software application upon a multi-threaded OS (e.g., Linux). Here, each of the DPUs executes on a designated thread, and the OS schedules thread execution. It will be appreciated that this technique breaks data processing (e.g., radar signal data processing) into a sequence of independent processing steps (i.e., filters) and leverages existing OS schedulers to distribute these algorithms within a multi-core computer, providing high-throughput. In some embodiments, the common software application includes a dedicated thread (referred to herein as the "parent thread") responsible for managing (e.g., "spawning" and "reaping") child threads designated for the DPUs. In one embodiment, the parent thread is responsible for receiving input data from an external data source (e.g., a radar) and moving (e.g., copying) the input data to the first DPU 100a. For example, as data arrives from the external data source, the parent thread moves the data to first DPU 100a's queue and notifies the first DPU 100a that data is available (e.g., by incrementing a semaphore associated with the queue 104). In embodiments, the threads comprise Portable Operating System Interface (POSIX) threads ("pthreads").

In some embodiments, the DPUs 100a-100d are provided as two or more processes configured to execute concurrently on a multitasking OS (e.g., Linux). Each of the DPUs executes within a designated process, and the OS manages process scheduling. Here, any suitable IPC technique can be used to move (e.g., copy) data between processes and provide notification of available data. In yet another embodiment, two or more of the DPUs 100a-100d execute on different virtual and/or physical computing platforms. Here, any suitable networking protocols can be used to move data between the remote processes and provide notification of available data.

It will be appreciated that any of the above parallel processing techniques (i.e., multi-threading, multitasking, and or using multiple computing platforms) can be combined to provide a signal data processing system that scales to any arbitrary number of processor cores and computers without requiring custom hardware or complex parallel processing software.

Figure 2:
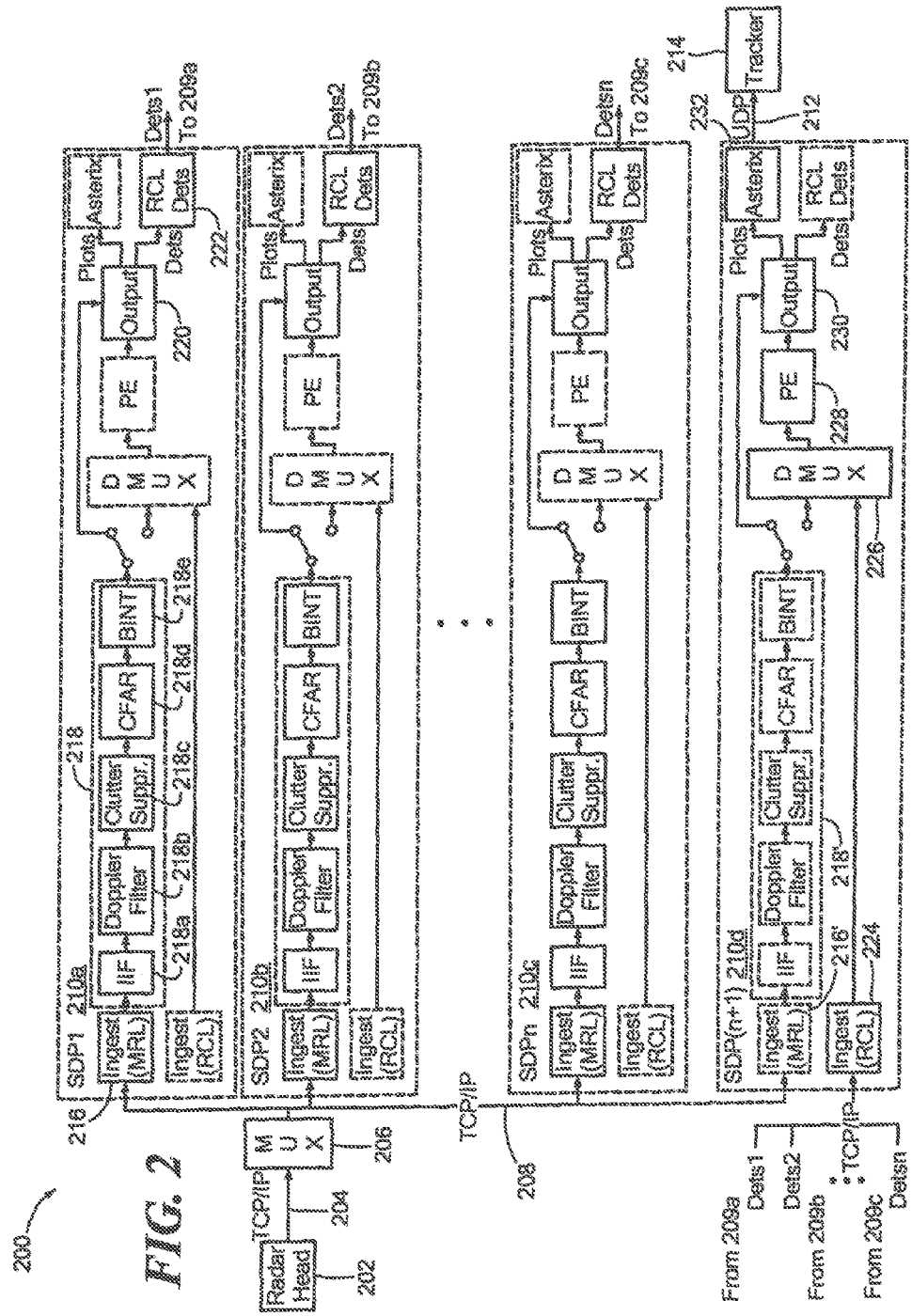
FIG. 2 is a block diagram of an illustrative system including signal data processors (SDPs) operatively coupled to a radar.

Referring to FIG. 2, an illustrative system 200 includes a radar 202 operatively coupled to a multiplexer 206 via a first signal path 204, one or more signal data processors (SDPs) 210 operatively coupled to the multiplexer 206 via a second signal path 208, and a radar tracker 214 operatively coupled to one or more of the SDPs via a third signal path 212. The signal paths 204, 208, 212 are provided as any suitable combination of hardware and/or software-based signal paths. In embodiments, one or more of the signal paths 204, 208, 212 may include a network (or a portion thereof) operating, for example, using a packet-switched protocol (e.g., Internet Protocol (IP), Transmission Control Protocol (TCP), TCP/IP, etc.). Such a network may include relays, switches, routers, and the like. In a particular embodiment, signal paths 204 and 208 correspond to high-speed, dedicated packet-switched networks and the signal path 212 corresponds to a radar data network known in the art.

In embodiments, the radar 202 is located upon a mobile platform (e.g., a land vehicle, an aircraft, or an unmanned aerial vehicle (UAV)) coupled to a remote situational display (e.g., located within a base station) via a wireless communication link. Because the bandwidth in such a link may less than that required to transmit "raw" radar pulse data, one or more SDPs 210 may be collocated with the radar upon the mobile platform. Thus, the mobile SDPs 210 analyze the radar pulse data to generate relatively low bandwidth track information which can be transmitted to the remote situational display.

The illustrative system 200 includes four SDPs: a first SDP 210a, a second SDP 210b, a third SDP 210c, and a fourth SDP 210d; in general, any number of SDPs greater than zero may be used. In embodiments, each of the SDPs 210 corresponds to a separate physical and/or virtual computing platform (e.g., a general-purpose computer comprising a multitasking, multi-threaded OS, such as Linux). In other embodiments, two or more SDPs 210 correspond to application processes executing on a common computing platform having a multitasking OS. In yet another embodiment, at least one of the SDPs 210 is provided across multiple computing platforms.

As shown, a plurality of the SDPs (e.g., SDPs 210a-210c) receive data (e.g., digital pulse data) from the radar 202 via the multiplexer 206 and, therefore, are referred to herein as "detector SDPs." In contrast, at least one of the SDPs (e.g., SDP 210d) receives data from more than one source (e.g., one SDP may receive detection data from two or more detector SDPs 210a-210c) and, therefore, is referred to herein as the "aggregator SDP." In general, each of the detector SDPs 210a-210c have generally the same components and functionality; thus, for clarity and simplicity of explanation, only the detector SDP 210a will be described in detail herein. The detector SDPs 210a, 210b, and 210c are coupled to the aggregator SDP 210d via respective signal paths 209a, 209b, and 209c. In some embodiments, the signal paths 209a-209c and the signal path 208 correspond to portions of the same packet-switched network.

The representative detector SDP 210a comprises an ingest module 216 operatively coupled to receive data (in this example, digital pulse data) from the multiplexer 206. A plurality of DPUs generally denoted 218 are operatively coupled to receive the pulse data from the ingest module 216, and an output module 220 is operatively coupled to receive processed data from the plurality of DPUs 218. A detection output module 222 is operatively coupled to receive processed data from the output module 220 and to transmit detection data to the aggregator SDP 210d via the signal path 209a. The various components 216-222 are operatively coupled via any combination of hardware and/or software-based signal paths. The representative detector SDP 210a may include additional components and/or signal paths that are optional, unused, or disabled (e.g., the components shown with hatching in FIG. 2). The reason for this is discussed below in conjunction with the aggregator SDP 210d.

Although the concepts and techniques sought to be protected herein are not limited to performing any particular or specific type of processing, in one embodiment the DPUs 218 comprise an IIF 218a, a Doppler filter 218b, a clutter filter 218c, a CFAR 218d, and a binary integrator 218e, as shown, to perform a technique for processing radar data. For simplicity of explanation, the DPUs 218a-218e are referred to herein by the name of their respective filters, although it will be understood that the DPUs typically include additional elements, as shown in FIG. 1. The DPUs 218a-218e may be arranged in series to form a pipeline, as shown, with a first end of the pipeline (i.e., the IIF 218a) coupled to receive data from the ingest module 216 and a second end of the pipeline (i.e., the binary integrator 218e) coupled to the output module 220. In embodiments, the detection output module 222 is also implemented as a DPU (i.e., the functionality described herein with respect to this module may be implemented within a DPU filter 106 of FIG. 1). Any of the plurality of DPUs 218 may be the same as or similar to the DPU 100 of FIG. 1.

An illustrative aggregator SDP 210d comprises an ingest module 224 operatively coupled to receive detection data from the detector SDPs 210a, 210b, and 210c via the respective signal paths 209a, 209b, and 209c. The aggregator SDP 210d further comprises a demultiplexer 226 operatively coupled to receive detection data from the ingest module, a plot extractor 228 operatively coupled to receive aggregate data from the demultiplexer 226, an output module 230 operatively coupled to receive plot data from the plot extractor 228, and a plot translation module 232 operatively coupled to receive plot data from the output module 230.

The various components 224-232 are connected via any combination of hardware and/or software-based signal paths. The plot translation module 232 receives combined detections from the plot extractor 228 and translates that information to the ASTERIX format, which may be received and used by external systems known in the art, such as the radar tracker 214. The output module 230 may be the same as or similar to output module 220 within the detector SDP 220a; however, whereas the module 220 is configured to send data to the detection output module 222, the module 230 is configured to send data to the plot translation module 232, as shown. In embodiments, the plot extractor 228 and/or plot translation module 232 are implemented as DPUs (i.e., the functionality described herein with respect to these components may be implemented within a DPU filter 106 (FIG. 1).

In some embodiments, the detector SDPs 210a-210c and the aggregator SDP 210d generally include the same components and signal paths, although certain components may be unused or disabled (e.g., the components shown with hatching in FIG. 2). However, these different types of SDPs operate differently as a result of different configurations and/or different inputs. For example, the aggregator SDP 210d may include a plurality of DPUs 218' coupled to second ingest module 216', however these DPUs are effectively disabled because the multiplexer 206 is not configured to transmit pulse data to the second ingest module 216'. It will be appreciated that by providing the same components in each of the SDPs 210, the SDPs are generally interchangeable and setup and maintenance costs may be reduced. In other embodiments, an SDP 210 includes only those components and signal paths that are needed for its intended operation and, therefore, the components shown with hatching FIG. 2 may be omitted.

In operation, the radar 202 transmits RF signals (e.g., pulse signals), typically using a modulation scheme as is generally known. The radar 202 receives analog signals comprising echo signals ("echos") as well as clutter. The received analog signals are encoded using digital pulse compression coding known in the art. The encoded pulse data formatted for transmission via the signal path 204 using any suitable transmission protocol. For example, the radar 202 may segment (or "chunk") the encoded pulse data into blocks for transmission through a packet-switched network. In embodiments, the blocks of encoded data are transmitted within IP packets, TCP/IP packets, etc. In embodiments, metadata is transmitted along with the pulse data for use by the SDPs 210. The metadata can include, but is not limited to, the time the pulse data was generated by the radar 202, the orientation of the radar antenna at the time the data was generated, and/or other state information regarding the radar.

The multiplexer 206 receives encoded pulse data from the radar 202, selects a target detector SDP 210a-210c to process the received data, and transmits the received data to the target SDP via the signal path. This process may be repeated for each block of pulse data received. The target SDP 210a-210c is selected using any suitable load balancing technique. In some embodiments, the multiplexer 206 uses a simple round-robin load balance technique. In other embodiments, the multiplexer 206 actively monitors the SDPs 210a-210c to provide fault tolerance and/or dynamic load balancing.

Figure 3:
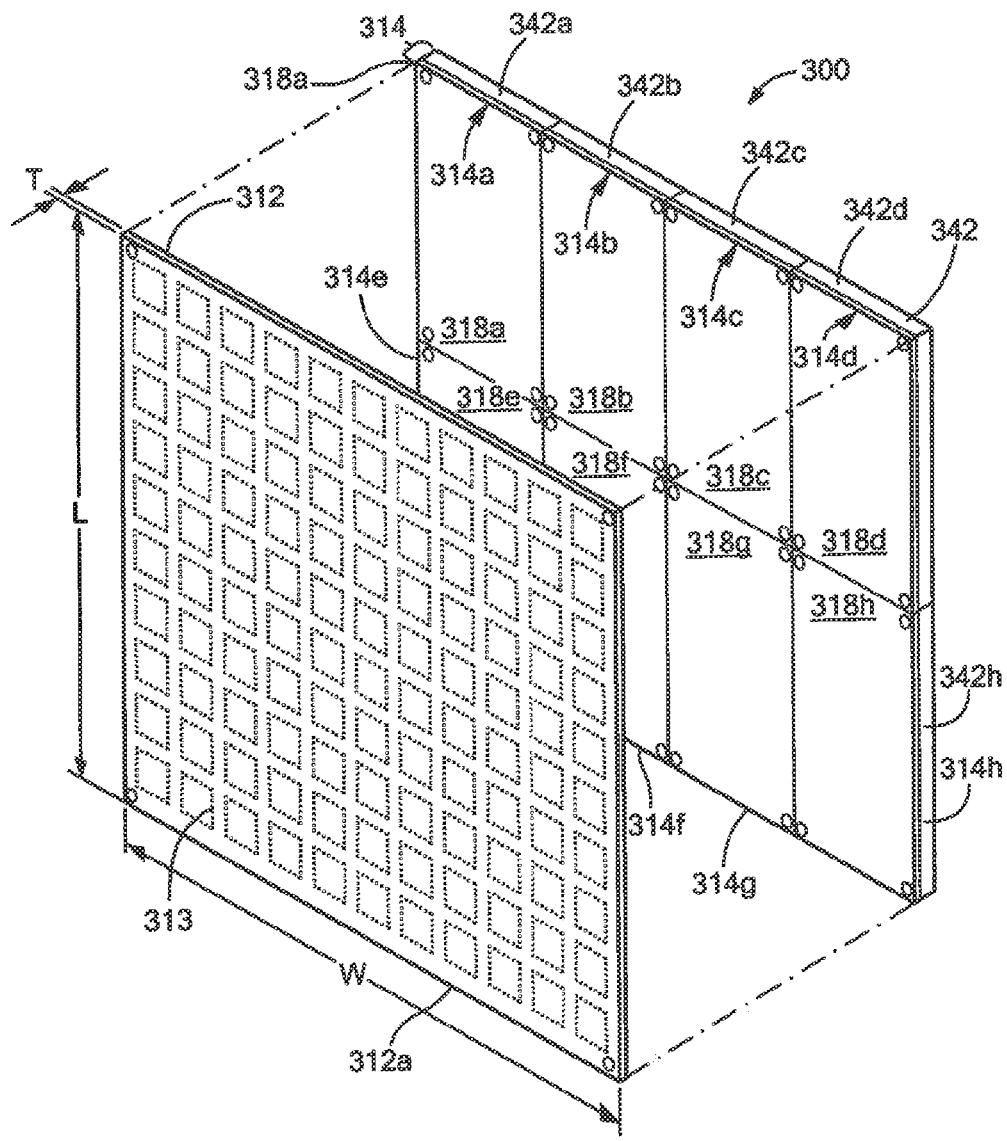
FIG. 3 is an isometric view of an active, electronically scanned array (AESA) having a panel architecture.

In some embodiments, the radar 202 includes an array (e.g., the active electronically steered array (AESA) of FIG. 3) having a plurality of subassemblies (e.g., subassemblies 314a-314h of FIG. 3). By adjusting the phase of the signal transmitted/received by each individual element, the array is capable of producing and steering a beam having defined center angles of azimuth and elevation, and having defined angular width and height. In this case, the radar 202 transmits metadata identifying a corresponding beam azimuth and elevation angles. In turn, the multiplexer 206 can use the azimuth/elevation information to select target detector SDPs. This allows individual detector SDPs 210a-210c to retain spatial awareness across radar scans without having to communicate with other detector SDPs 210a-210c. For example, assuming radar 202 produces beams using twelve elevations numbered 1-12, the multiplexer 202 may target elevations 1-4 to SDP 210a, elevations 5-8 to SDP 210b, and elevations 9-12 to SDP 210c.

Next, the selected target detector SDP (e.g., SDP 210a), or more specifically the ingest module 216 therein, receives encoded pulse data from the radar 202 via the multiplexer 206 and signal path 208. In embodiments, the ingest module 216 comprises a network service to receive pulse data from the network and to copy the received data to the queue of the first DPU in the pipeline (i.e., to the queue of the IIF 218a). In various embodiments, the ingest module 216 performs error checking and/or correction to handle communication errors (e.g., dropped packets, out-of-order packets, etc.) introduced by the radar 202 and/or networks 204, 208.

Next, the pulse data is processed by each of the DPUs 218, as described above in conjunction with FIG. 1A, to generate processed data. Advantageously, two or more of the DPUs 218 can process signal data concurrently, relying on a multitasking/multi-threading OS to schedule the work, thus improving throughput performance.

Next, the output module 220, which is coupled to the output port 108 (FIG. 1) of the binary integrator 218e, transfers the processed data to the detection output module 222. The detection output module 222 sends detections (i.e., candidate targets) represented by the processed data provided by the plurality of DPUs 218 to the aggregator SDP 210d.

The aggregator SDP 210d, or more specifically the ingest module 224 therein, receives detection data from one or more of the detector SDPs 210a-210c via a respective signal path 209a-209c. As with the ingest module 216 described above, the ingest module 224 may comprise a network service. In embodiments, the ingest module 216 listens on a first network port and the ingest module 224 listens on a second different network port.

The demultiplexer 226 receives detection data from the ingest module 224 and applies correlation and aggregation techniques to generate aggregate data suitable for performing plot extraction. In one embodiment, the demultiplexer 226 uses the metadata (e.g., a radar beam azimuth and elevation angles) to reconstruct data corresponding to the full radar aperture from blocks of data corresponding to sub-apertures of the radar. It should be understood that the system 200 generally does not provide real-time behavior and, for example, unpredictable delays may be introduced by the various signal paths and processing steps. Thus, to effectively correlate processed data in time, the demultiplexer 226 may collect blocks of data (e.g., using a buffer, a bounded buffer, etc.) and perform correlation/aggregation only when a sufficient number of blocks are received for a given time period.

The plot extractor 228 receives aggregate data from demultiplexer 226 and outputs a stream including digital representations of plots using any suitable technique known in the art.

The plot translation module 232 receives plot information from the plot extractor 228 and formats the data for transmission through the network 212, which may comprise a radar data network. In some embodiments, the data is formatted according to the All Purpose Structured Eurocontrol Surveillance Information Exchange (ASTERIX) standard. As is known in the art, the formatted data may be used by a radar tracker 214 via the network 212 to form and update target tracks.

Referring to FIG. 3, the systems and techniques described above in conjunction with FIGS. 1, 1A, and 2 may be used in a radar system which includes an active electronically steered array (AESA) 300. In some embodiments, the AESA 300 includes an antenna panel 312 (also referred to as a "panel array") coupled to an integrated panel array assembly (IPAA) 314. Antenna panel 312 is thin and generally planar and has a plurality of antenna elements generally denoted 313, disposed to transmit and receive RF energy through a first surface 312a thereof. Antenna elements 313 are shown in phantom since they are typically below external surface 312a and thus not directly visible in FIG. 3.

In one example, the antenna elements 313 may be provided as a stacked patch antenna antenna elements configured for operation in the X-band frequency range and panel array is provided having a thickness, T in the range of about 0.003 meter (m) to about 0.01 m (with a thickness typically of about 0.005 m being preferred) and having a width, W, of about 0.5 m and a length, L, of about 0.5 m with 1024 patch antenna elements (not all shown visible in FIG. 3).

The IPAA 314 is provided from a plurality of subassemblies mechanically coupled together, with eight subassemblies 314a-314h shown in this example. Each of the subassemblies 314a-314h includes a corresponding one of a plurality of active panels 318a-318h and a corresponding one of a plurality of cold plates 342a-342h (cold plates 342e-342g are not shown). The cold plates 342a-342h cool corresponding ones of the active panels 318a-318h. The cold plates 342a-342h may be air cooled, liquid cooled, or both. Each of active panels 318a-318h is electrically coupled to the antenna panel 312 via a first surface thereof. A second surface (not visible) of active panels 318a-318h have active circuits (not visible in FIG. 3) disposed thereon.

In one embodiment, the AESA 310 comprises eight subassemblies 314a-314h in one 0.5 m×0.5 m assembly (i.e., L=0.5 m and W=0.5 m in FIG. 3). In other embodiments, fewer or more than eight subassemblies 314a-314h may be used to provide an AESA having dimensions of 0.5 m×0.5 m. Also, the AESA may be provided having sizes other than 0.5 m×0.5 m. One of ordinary skill in the art will appreciate how to select the number of subassemblies to include in an AESA as well as the length, L, and width, W, required for a particular application.

Since the subassemblies 314a-314h are independent, they are sometimes referred to as line replaceable units (LRUs) which indicates that if one of subassemblies 314a-314h were to fail or begin to operate incorrectly or with degraded performance, the subassembly could be removed and a new subassembly could be inserted in its place. Some or all of the outputs from the individual subassemblies 314a-314h may be provided to an input of an SDP which may be the same as or similar to SDPs 210a-210d described above in conjunction with FIG. 2. The various SDP outputs may also be aggregated.

By appropriate selection of the active components coupled thereto, the active panels 318a-318h may be configured to provide a wide range of RF power levels and radar waveforms including short and long transmit pulses at multiple pulse repetition frequencies (PRFs). Different power levels are achieved by appropriate selection of the active components provided as part of the active panels 318a-318h. In some examples, monolithic microwave integrated circuit (MMIC) technologies are preferred and can be used to provide systems which operate with relatively low power T/R channels (e.g., less than about 1 watt (W) per T/R channel). Also, MMIC may be implemented using flip-chip attached circuits in the active panels 318a-318h to provide low power per T/R Channels. Also, flip-chip attached SiGe or RF (radio frequency) CMOS (complementary metal oxide semiconductor) circuits may be used in the active panels 318a-318h to achieve medium power channels (e.g., in the range of about 1 W to about 10 W per T/R transmit channel). Also, flip-chip circuits may be used in the active panels 318a-318h to provide high power channels. It should thus be appreciated that one panel architecture can handle T/R channel RF output peak power from milli-watts (mW) to tens of watts and average power from mW to watts. Thus, by populating the active panels 318a-318h with different types of active circuits (e.g., different types of ICs), the active panels 318a-318h may be appropriate for use in different types of radar or other RF systems.

The IPAA 314 described herein efficiently transfers heat (i.e., thermal energy) from an active panel 318 to a corresponding cold plate 342. Mounting the cold plate 342 directly to the active circuits (not shown) would reduce the number of thermal interfaces between the active circuits and the cold plate. However, due to the varying thickness of the active circuits and bows in the active panel 318 for which the active circuits are attached as well as bows in the cold plate 342 itself, interfacing each and every active circuit is difficult. Therefore, an IPAA 314 that mitigates these variances and provides a thermal interface between the active circuits and the cold plate 342 allows for an efficient transfer of dissipated thermal energy from the active circuits. As will be described further, a thermal conductive material connecting the active circuits with the cold plate 342 allows for efficient transfer of heat from the active circuits.

Figure 4:
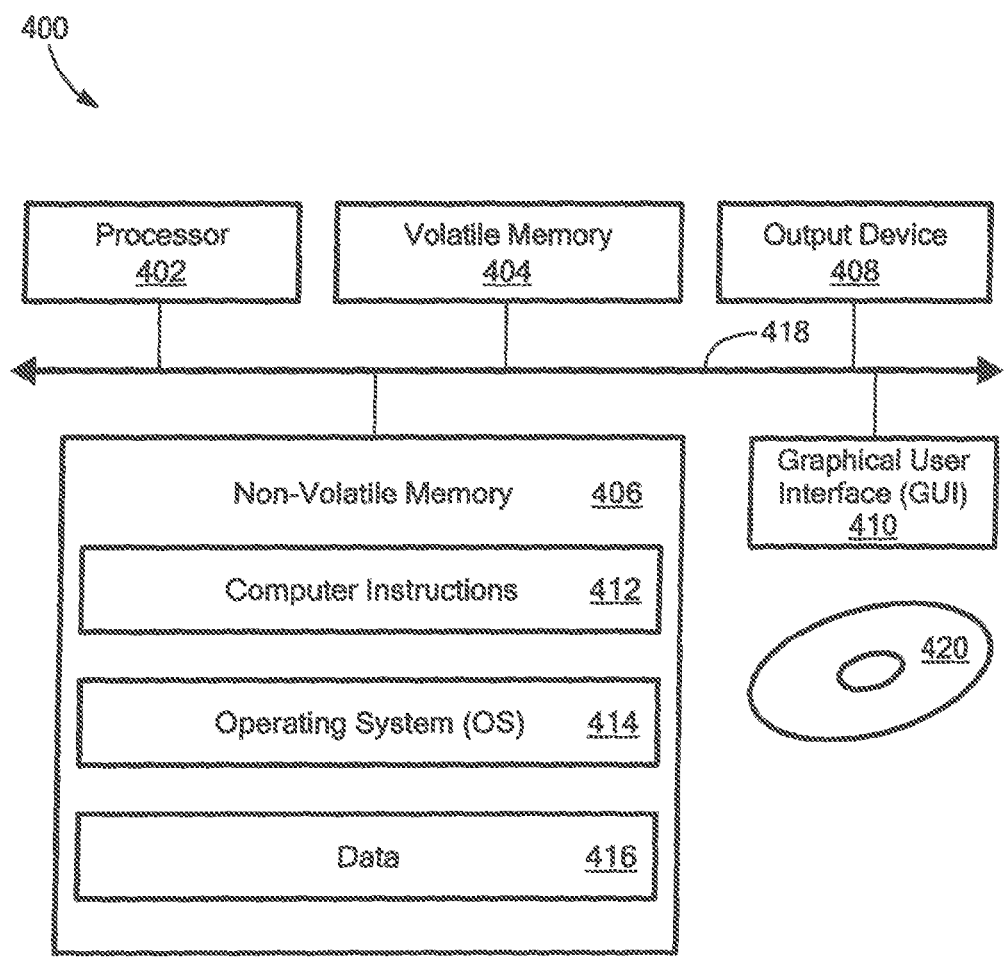
FIG. 4 is a schematic representation of an illustrative computer for use with the systems of FIGS. 1, 1A, and/or 2.

FIG. 4 shows an illustrative computer or other processing device 400 that can perform at least part of the processing described herein. The computer 400 includes a processor 402, a volatile memory 404, a non-volatile memory 406 (e.g., hard disk), an output device 408 and a graphical user interface (GUI) 410 (e.g., a mouse, a keyboard, a display, for example), each of which is coupled together by a bus 418. The non-volatile memory 406 stores computer instructions 412, an operating system 414, and data 416. In one example, the computer instructions 412 are executed by the processor 402 out of volatile memory 404. In one embodiment, an article 420 comprises non-transitory computer-readable instructions.

Processing may be implemented in hardware, software, or a combination of the two. In embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

A non-transitory machine-readable medium may include but is not limited to a hard drive, compact disc, flash memory, non-volatile memory, volatile memory, magnetic diskette and so forth but does not include a transitory signal per se.

Having described certain embodiments, which serve to illustrate various concepts, structures, and techniques sought to be protected herein, it will be apparent to those of ordinary skill in the art that other embodiments incorporating these concepts, structures, and techniques may be used. Accordingly, it is submitted that that scope of the patent should not be limited to the described embodiments but rather should be limited only by the spirit and scope of the following claims.

What is claimed is:

1. A system for processing radar data, the system comprising:
   a plurality of detector signal data processors (SDPs) coupled to receive radar data and to generate detection data, each of the detector SDPs comprising at least one processor and a plurality of data processing units (DPUs) executing on the processor, each of the DPUs comprising an input port, a queue, a filter, and an output port, each of the DPUs to receive data into the queue via the input port, to determine data is available in the queue, to remove the available data from the queue, to process the available data using the filter, and to output the processed data at the output port;
   an aggregator SDP coupled to receive detection data from two or more of the plurality of detector SDPs and, in response thereto, to generate a stream of plot information based upon the received detection data; and
   a radar tracker coupled to receive the stream of plot information from the data aggregation processor.

2. The system of claim 1 wherein the radar data comprises digital pulse compressed data.

3. The system of claim 1 further comprising a multiplexer coupled to receive the radar data and to select one of the plurality of detector SDPs to process the received radar data.

4. The system of claim 1 wherein the aggregator SDP comprises a demultiplexer to correlate and aggregate the received detection data.

5. The system of claim 1 wherein at least one of the plurality of detector SDPs comprises a plurality of DPUs arranged in series.

6. The system of claim 1 wherein the least one of the plurality of detector SDPs comprises a DPU having an impulsive interference filter (IIF), a DPU having a Doppler filter, a DPU having a clutter filter, and a DPU having a constant false alarm rate (CFAR).

7. The system of claim 1 wherein the aggregator SDP further comprises a plot extractor.

8. The system of claim 1 wherein the aggregator SDP comprises a data formatter to generate the stream of plot information according to the Structured Eurocontrol Surveillance Information Exchange (ASTERIX) standard.

9. The system of claim 1 wherein the plurality of detector SDPs and the aggregator SDP are coupled via a packet-switched network.

10. The system of claim 9 wherein at least one of the detector SDPs further comprises an ingest module to receive the radar data via the packet-switched network and to copy the received radar data to the queue of at least one of the respective DPUs.

11. The system of claim 1 wherein the aggregator SDP is coupled to the radar tracker via a radar data network.

12. The system of claim 3 wherein a radar comprises a phased array antenna, wherein the radar data comprises blocks of data having associated elevation angles, wherein the multiplexer selects one of the plurality of detector SDPs based upon an elevation angle associated with the received radar data.

13. The system of claim 1 wherein at least one of the detector SDPs comprises two or more DPUs configured to execute on separate threads.

14. The system of claim 1 wherein at least one of the DPUs uses a semaphore to determine data is available in a queue.

15. A method for processing radar data, the method comprising:
   receiving radar data;
   moving the radar data to a first queue;
   determining the radar data is available in the first queue;
   removing the radar data from the first queue;
   processing the radar data using a first filter to generate first processed data;
   moving the first processed data to a second queue;
   determining the first processed data is available in the second queue;
   removing the first processed data from the second queue;
   processing the first processed data using a second filter to generate second processed data;
   performing plot detection on the second processed data to generate detection data;
   aggregating the detection data with other detection data to generate aggregate detection data; and
   performing plot extraction on the aggregate detection data to generate a stream of plot information.

16. The method of claim 15 further comprising providing the stream of plot information to a radar tracker.

17. The method of claim 15 wherein moving radar data to a first queue is executed on a first thread and processing the radar data using a first filter to generate first processed data is executed on a second thread.

18. The method of claim 15 wherein determining the radar data is available in the first queue comprises reading the value of a semaphore.

19. The method of claim 15 wherein the first filter comprises an IIF, a Doppler filter, a clutter filter, a CFAR, a cell-averaging CFAR, an ordered statistic CFAR, a binary integrator, a beamformer, or an external interference cancellation filter.

20. The method of claim 15 wherein the radar data comprises blocks of digital pulse compressed data.

* * * * *